Aug. 2, 1966    S. O. GRÖNLUND    3,264,446
WELDING MACHINE FOR SEAM FLANGES OF SHEETS

Filed Dec. 16, 1963

INVENTOR

SVEN OLOF GRÖNLUND

BY  *Young + Thompson*

ATTORNEYS

Aug. 2, 1966 S. O. GRÖNLUND 3,264,446
WELDING MACHINE FOR SEAM FLANGES OF SHEETS
Filed Dec. 16, 1963 6 Sheets-Sheet 2

INVENTOR
SVEN OLOF GRÖNLUND
BY Young + Thompson
ATTORNEYS

INVENTOR
SVEN OLOF GRÖNLUND
BY Young & Thompson
ATTORNEYS

INVENTOR

SVEN OLOF GRÖNLUND

BY Young + Thompson

ATTORNEYS

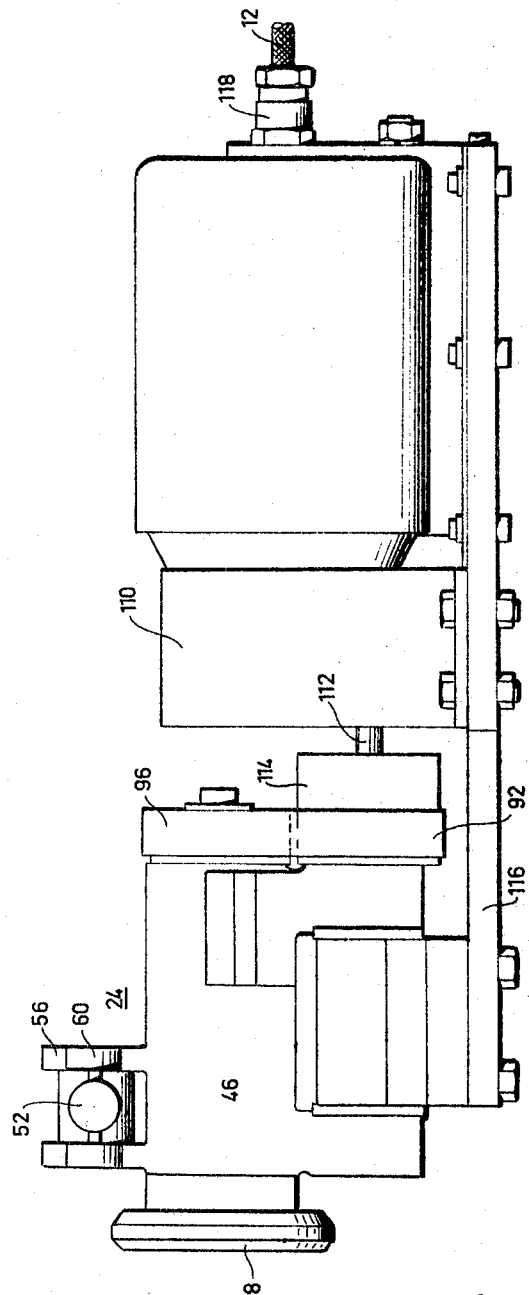

Aug. 2, 1966　　　S. O. GRÖNLUND　　　3,264,446
WELDING MACHINE FOR SEAM FLANGES OF SHEETS
Filed Dec. 16, 1963　　　　　　　　　　　　6 Sheets-Sheet 6
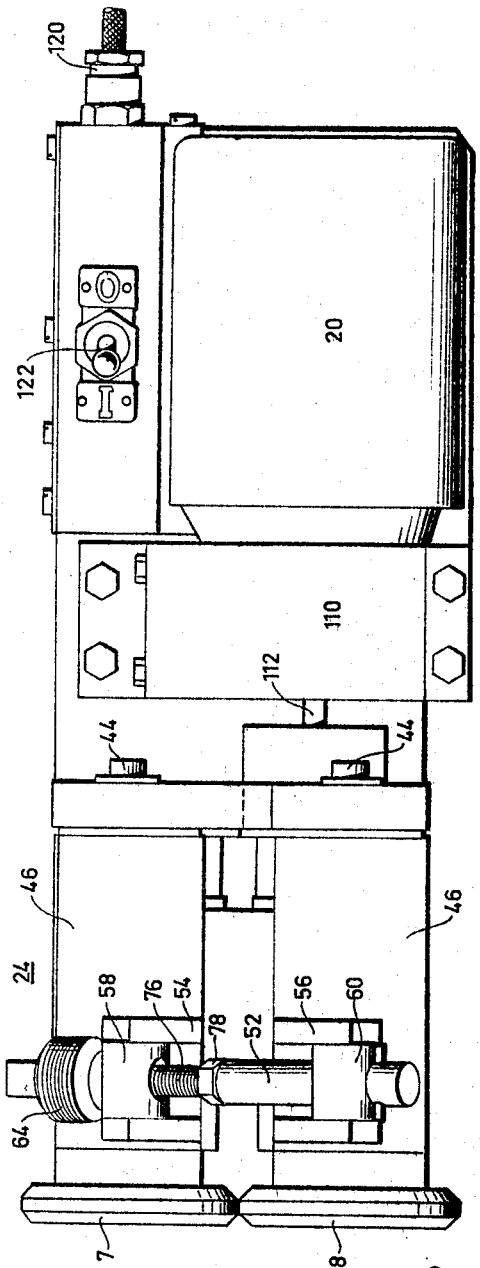
INVENTOR
SVEN OLOF GRÖNLUND
BY
ATTORNEYS

United States Patent Office 3,264,446
Patented August 2, 1966

3,264,446
WELDING MACHINE FOR SEAM FLANGES
OF SHEETS
Sven Olof Grönlund, Marumsgatan 16, Skara, Sweden
Filed Dec. 16, 1963, Ser. No. 330,732
Claims priority, application Sweden, Dec. 10, 1963,
13,701/63
8 Claims. (Cl. 219—82)

The object of the invention is to provide a welding machine which to a great extent eliminates or facilitates manual work, particularly in the manufacture of roof coverings in which there usually are extensive joints requiring a long time to accomplish.

In its broadest aspect the invention is characterized in that the machine comprises roller electrodes which are adapted to engage the upright seam flanges on either side thereof and are secured on shafts transversely movable toward and away from each other under the action of a clamping device which yieldingly tends to force the roller electrodes toward each other, said shafts being motor-driven so that the machine, upon rotation of the shafts and the roller electrodes, is advanced along the seam flanges while joining said flanges by electric resistance welding. Due to this arrangement the machine advances itself according as the welding operation proceeds without the necessity of adding filler material, resulting in a highly simplified procedure. The capacity of the machine is very high resulting in that continuous welds are obtainable in a considerably shorter time than in case of joining roofing sheets according to conventional methods. In addition the joint is extremely tight.

In order to obtain the required contact pressure between the seam flanges to be welded together, the shafts of the roller electrodes may be mounted in individual bearing cases which are pivotally mounted on intermediate shafts disposed in the frame of the machine, the clamping device for the roller electrodes being connected with the bearing cases such that the cases can be moved toward each other by means of the clamping device so as to actuate the roller electrodes correspondingly.

Figure 5:
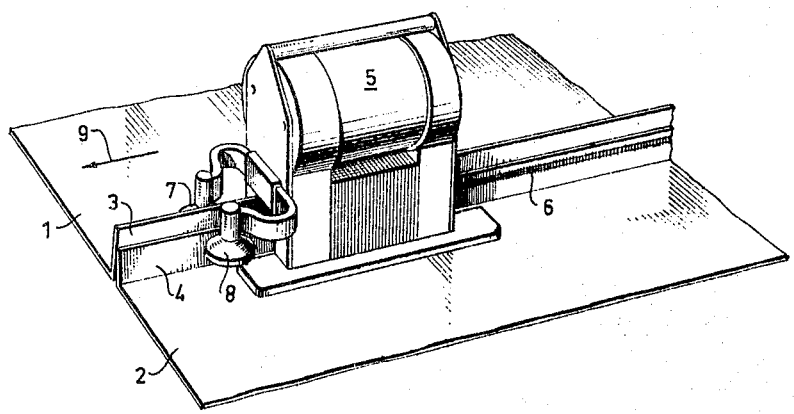

Additional features of the invention and advantages obtained thereby will appear from the following description of embodiments illustrated in the annexed drawing. FIGS. 1–4 illustrate an embodiment of a motor-driven welding machine according to the invention as viewed in four directions at right angles to each other, FIG. 1 being a vertical lateral elevation, FIG. 2 a corresponding top view, FIG. 3 a front end view of the machine, and FIG. 4 a rear end view of the machine, the terms front and end being related to the direction of movement of the machine during the welding operation. FIG. 5 illustrates a diagrammatic perspective view of the machine in operation. FIGS. 6 to 9 illustrate a welding head comprised in the machine according to FIGS. 1 to 4, FIG. 6 showing the welding head as viewed from below, FIG. 7 being a sectional view along the line VII—VII in FIG. 6, FIG. 8 being an elevation as viewed from the right, and FIG. 9 being a top view of FIG. 6. FIGS. 10 and 11 illustrate two projections at right angles to each other of a simplified embodiment of a welding machine devised in accordance with the invention and intended for special works so as to be manually operated or guided while moving along the weld joint.

The machine illustrated in FIGS. 1 to 4, consists of a plurality of main parts which are assembled to form a unit adapted to move along the upright seam flanges of two adjacent sheets to be welded together. FIG. 5 illustrates a machine in operation, the two sheets being denoted at 1 and 2 and their upright flanges being welded together are denoted at 3 and 4. Reference numeral 6 denotes a weld joint made by the welding machine 5. Numerals 7 and 8 denote the roller electrodes of the machine. The welding operation is performed while the machine is moving in the direction indicated by the arrow 9.

The main part of the machine illustrated in FIGS. 1 to 4 consist of a switch 10 having terminals 12, 14 for motor current and welding current, respectively, a control handle 16, a transformer 18, a drive motor 20, a gear box 22, a welding head 24, supporting means in the form of a pair of runners or rails 26, and additional frame parts. The frame parts comprise a switch casing 27, a handle 28 for carrying the portable machine, a front support 30 for the handle, a holder frame 32 and two pairs of supports 34 by means of which other frame parts rest on the supporting means 26. The welding head 24 is carried by the holder frame 32 by means of an attachment plate 36 which is comprised in the welding head to be described with reference to FIGS. 6 to 9. Also considered to belong to the main parts of the machine is a junction box 38 to which electric current is passed from the switch 10 via a cable 40.

In the welding head illustrated in FIGS. 6 to 9 roller electrodes 7 and 8 are secured to flanges 42 on shafts 44 mounted in bearing cases 46. The shaft 44 of each roller electrode 7, 8 is mounted in an individual bearing case 46, and each bearing case is in turn mounted on a shaft 48 which is a countershaft and which extends through, and is supported by, a sleeve-like projection 50 on the above-named attachment plate 36. The bearing sleeves, and consequently the roller electrodes 7 and 8, can be swung toward and away from each other about the shafts 48 and are actuated by a clamping device which tends to keep the roller electrodes in engagement with each other or with seam flanges to be welded together and introduced between the rollers.

Figure 6:
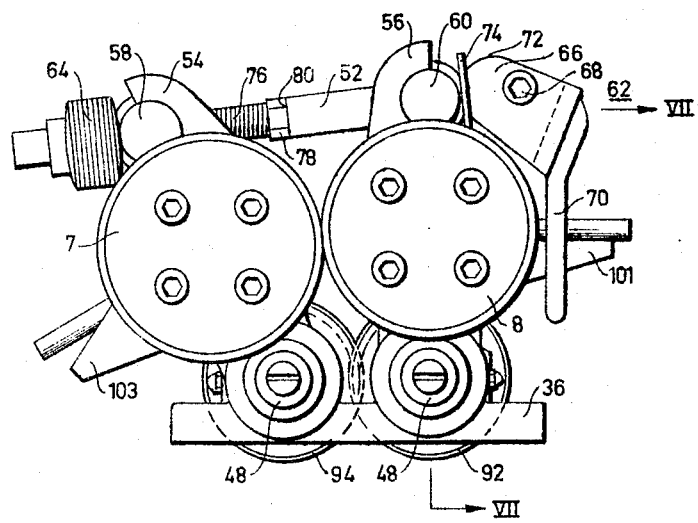
Figure 9:
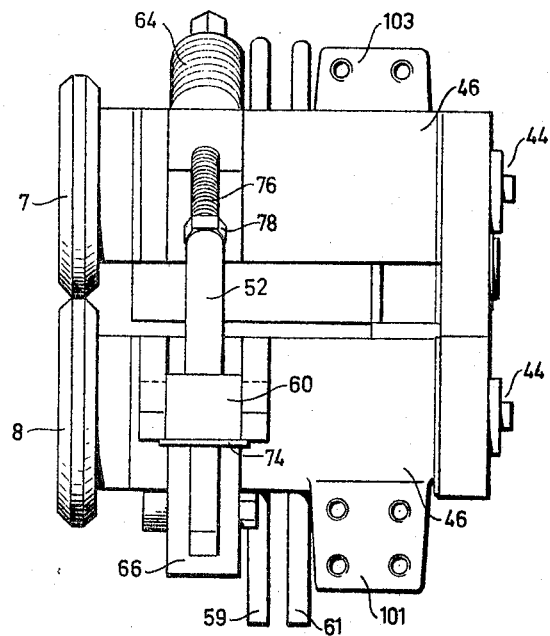

As will be seen especially from FIGS. 6 and 9, the clamping device comprises a rod 52, which extends between hook-like projections 54, 56 on the bearing cases 46 for the roller electrodes 7 and 8, respectively. The rod is spring actuated such as to tend to move the bearing cases and consequently the roller electrodes toward each other. The rod is provided with transversely extending pivots 58, 60 which consists of an electrically insulating material and are in engagement with the hook-shaped projections 54, 56. The rod is displaceable in its longitudinal direction in these pivots. One end of the rod is connected with a tensioning device 62 which permits a spring device in the form of spring plates 64 mounted on the other end of the rod to be pressed against the pivot 58, and the tensioning device abuts upon the other pivot 60. The tensioning device consists of a cam 66, journalled on a bolt 68 which extends through the rod 52 transversely thereof. The cam 66 has a handle 70 which, in the tensioning condition, assumes the position shown in FIG. 6 but can be swung upwards so that the cam surface 72 of the cam 66 will be disengaged from a spacer 74 disposed between the cam and the pivot 60. After the handle 70 has been swung upwards the clamping device can be removed and, in any case, the roller electrodes are moved from each other to enable the machine to be placed with the rollers in operative positions on either side of a pair of seam flanges of sheets to be welded together. In order to permit adjustment of the pressure exerted by the clamping device, the rod may be divided and one end portion thereof may be in the form of a screw 76 in engagement with a nut 78 which bears on a shoulder 80 of the rod so that the screw-threaded portion 76 can be screwed out of or into a screw-threaded axial bore in the rod 52 for varying the effective length between the pivots 58 and 60.

Figure 1:
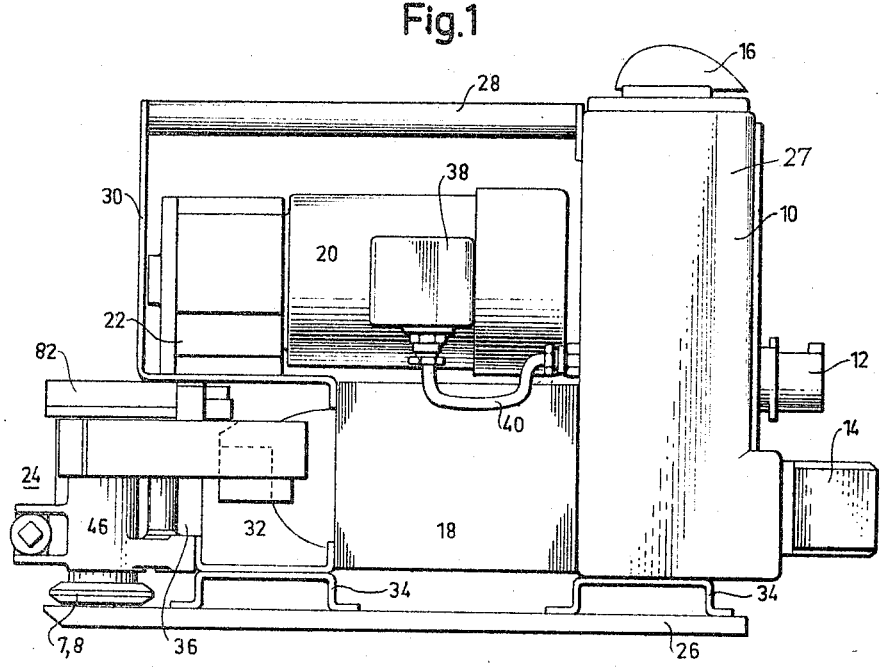
Figure 2:
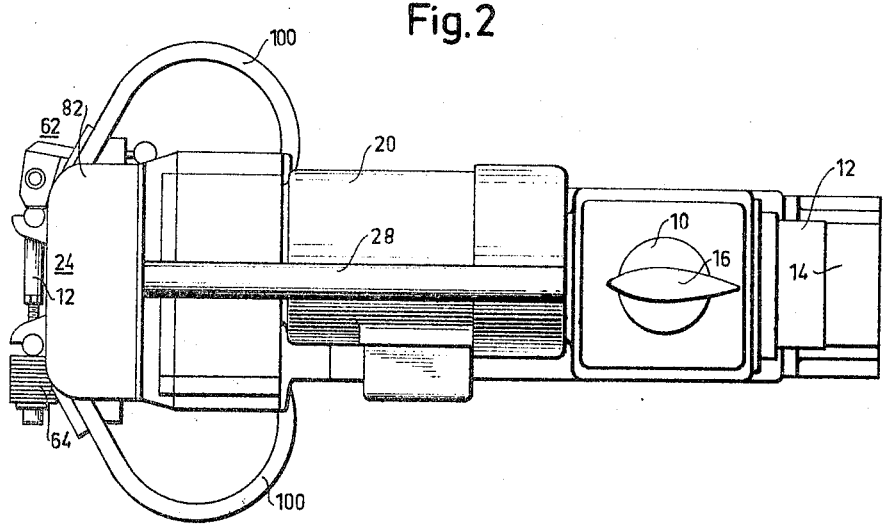
Figure 3:
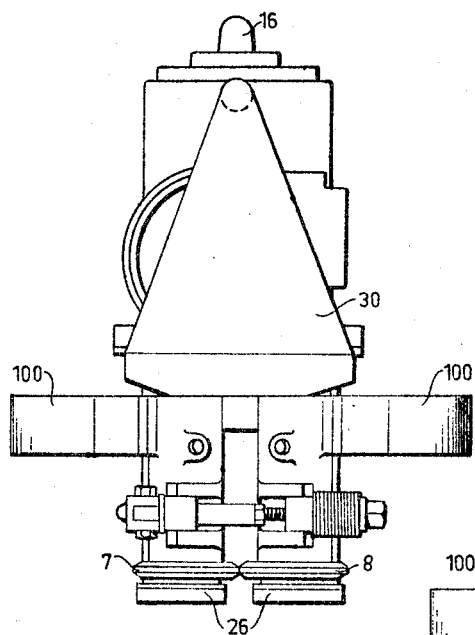
Figure 4:
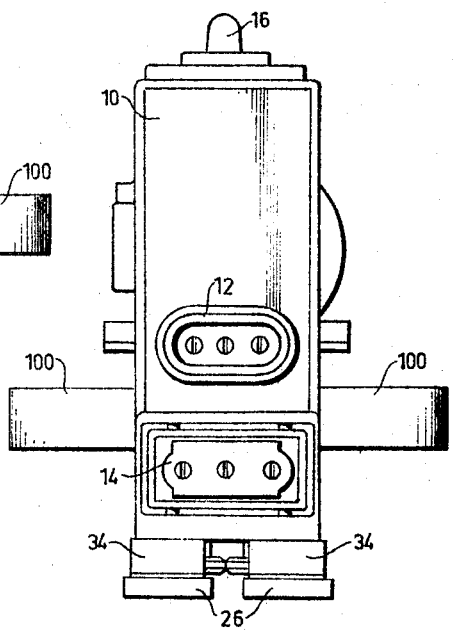

As will be seen from FIG. 1 the lower part of the front support 30 is secured to the holder frame 32 and between these parts there is provided a horizontal protective plate 82 which projects forward above the shaft of the roller electrodes 7, 8.

The shafts 44 of the roller electrodes are driven by the electric motor 20 via the gear box 22, the output shaft 88 (FIG. 7) of which has keyed thereon a gear wheel 90 in mesh with a gear wheel 92 which is mounted for rotation on the lay shaft 48 of one of the bearing cases 46. The gear wheel 92 is in mesh with a gear wheel 94 mounted on the lay shaft 48 of the other bearing case 46 (FIG. 6). The gear wheels 92 and 94 are in mesh with gear wheels 96 (FIG. 7) keyed onto the respective shafts 44 of the roller electrodes. If current is supplied to the motor 20, the shaft 88 is rotated and so is the gear wheel 90 which via the intermediate wheels 92 and 94 drives the shafts 44 and consequently rotates the roller electrodes 7 and 8.

Welding current can be supplied to the roller electrodes from the terminal 14 via the switch 16, the transformer 18 and a pair of curved laminated conductors 100 of copper, each having one end connected to the secondary transformer winding and their other end to attachments 101 and 103 on the bearing cases 46 which attachment conduct current to the shafts 44 of the roller electrodes. In order to prevent current from flowing from the shafts 44 and bearing cases 46 to other parts of the machine, the intermediate shafts 48 extend through electrically insulating bushings 102 (FIG. 7) and the gear wheel 96 is mounted on the shaft 44 by means of an insulating hub 104. Further, insulating spacers 106 are provided between the gear wheels 96, 92 on the one hand and the bearing cases 46 on the other hand.

Figure 7:
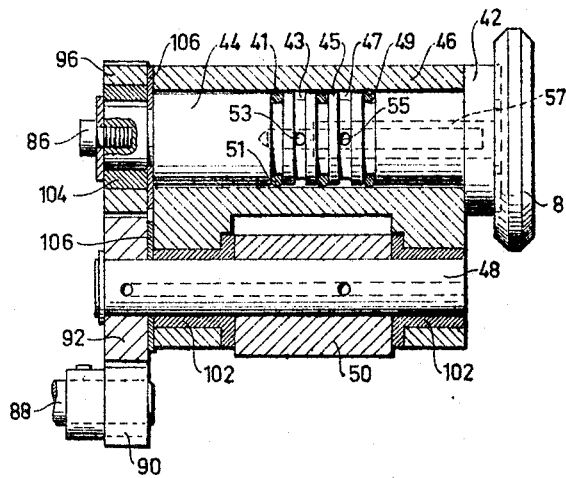
Figure 8:
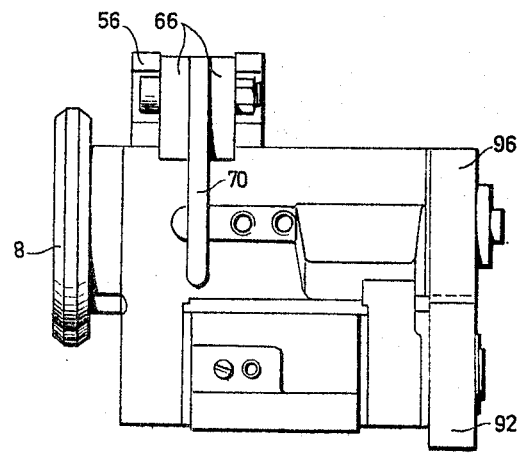

To avoid overheating of the electrodes and their shafts cooling ducts for circulating cooling liquid may be provided in these shafts. FIG. 7 shows five circumferential grooves 41, 43, 45, 47 and 49 in the shaft 44. The outermost grooves 41 and 49 and the middle groove 45 have packing rings 51 for effecting a seal in axial direction, whereas the two other grooves 43 and 47 communicate each with a radial hole 53 and 55, respectively. Through these holes cooling liquid passes to a duct 57 which extends to the roller electrode 8 and back again. The grooves 43 and 47 communicate with tubes 59 and 61 (FIG. 9), respectively, which project outwards through the bearing case 46 for one shaft 44 of the roller electrode and serve the purpose of supplying and discharging cooling liquid. A similar arrangement is provided in the other bearing case.

The machine illustrated in FIGS. 10 and 11 is in the first place intended to be used for welding seams extending along surfaces which are not plane, but curved in one way or other. In this case the machine cannot be guided by the surfaces of the sheets as in the above described embodiment, but must be guided manually while moving along the seam flanges. For this reason the roller electrodes 7 and 8 are not disposed at right angles to the shaft of the drive motor 20 as in the previous embodiment, but are parallel to this shaft so that the machine can be guided more easily by hand or hands during the welding operation. Between the motor 20 and the welding head 24 which is essentially devised in the manner shown in FIGS. 6 to 9 there is provided a change gear 110 the output shaft 112 of which is coaxial with, and by means of a coupling 114 directly connected to, the gear wheel 92 which drives the roller electrode 8 via the gear wheel 96.

For the purpose of avoiding that the manually operated machine shall become too heavy and clumsy in manipulation, the base plate 116 of the machine carries, in addition to the welding head 24, only the motor 20 and the gear box 110, whereas the transformer and conductors (not shown) for the welding current are separately disposed. For the motor current there are provided a connection 118 for a cable 120 and a switch 122 for closing and opening the circuit.

The clamping device for the roller electrodes on the welding head may be devised as illustrated in FIGS. 6 and 9, but alternatively may be simplified by omitting the tensioning device 62. FIG. 11 shows the rod 52 of the clamping device and the screw-threaded portion 76, nut 78, spring plates 64 and pivots 58, 60 which cooperate with hook-shaped projections 54, 56 on the bearing cases 46 for the shafts 44 of the roller electrodes.

To set the machine illustrated in FIGS. 10 and 11 to work the motor is started to have the roller electrodes rotate in engagement with each other. Then the machine is moved with the shafts of the roller electrodes directed obliquely against the seam flanges to be welded to each other while the confronting edge portions of the roller electrodes are brought into contact with the seam flanges such that the roller electrodes are forced to travel onto the flanges. The roller electrodes are then disposed on either side of the seam flanges which are clamped toward each other. The shafts of the roller electrodes are positioned, as far as possible, at right angles to the surfaces of the sheets whereupon the welding current is switched on (the devices for this purpose are not illustrated, but may be analogous to the previous embodiment but provided on a separate transformer). Due to the rotation of the roller electrodes the machine is advanced along the seam flanges while being manually held in a suitable position. The welding is essentially an electric resistance welding without the necessity of supplying filler material to the weld area. Instead the weld joint is obtained due to the fact that the seam flanges are heated and welded together by the welding current flowing therethrough. The roller electrodes have cylindrical edge portions in engagement with the seam flanges and the widths of the weld joint corresponds to the widths of the edge portions.

What is claimed is:

1. A welding head for welding upright seam flanges of metallic sheets comprising a supporting plate, pivots carried by said supporting plate, shafts parallel with said pivots, bearing casings for said shafts swingably mounted on said pivots, electrode rollers mounted on said shafts, and clamping means connecting said bearing casings to force the roller electrodes into peripheral contact with the seam flanges to be welded when located at opposite sides of said flanges.

2. A welding head as claimed in claim 1 and further characterized by the fact that the clamping means comprises a rod which extends between hook-shaped projections on the bearing casings and is spring-actuated such as to tend to move the bearing casings and consequently the electrodes in a direction toward each other.

3. A welding head as claimed in claim 1 and further characterized by the fact that the clamping means comprises a rod, electrically insulating transverse pivots, hook-shaped projections secured to said bearing casings, the transverse pivots cooperating with said projections, tensioning means pivoted on said rod and a spring means actuating the rod in the longitudinal direction thereof, said rod being longitudinally displaceable in said transverse pivots whereby the tensioning means is forced towards one pivot under the action of the spring means.

4. A welding head as claimed in claim 1 and further characterized by the fact that the clamping device comprises a rod and spring means actuating the rod for forcing the said bearing casings yieldingly toward one another, said rod being adjustable as to its length for varying the spring force exerted by the clamping device.

5. A welding machine for welding upright seam flanges of sheet metal, comprising frame means, rotary shafts, roller electrodes carried by said shafts, bearing casings for said shafts, a pivot for each bearing casing in said frame means to enable swinging movement of the bearing casings toward and away from one another, a clamping device connected with said casings to force the casings toward one another, means to rotate at least one of the shafts to cause the electrodes to travel along the seam flanges when located in contact with opposite sides of the said flanges and forced thereagainst by said clamping means, the pivots being countershafts in a gear transmission comprising a gear wheel rotatably mounted on each countershaft, and a gear wheel on each electrode shaft, the gear wheels on the countershafts intermeshing and meshing each with one of the gear wheels on the electrode shafts, whereby the roller electrodes are operable simultaneously and at the same speed for the movement along the seam flanges.

6. A welding machine as claimed in claim 5 and further characterized by the fact that said rotating means comprises an electric motor with a drive shaft and a gear transmission with an output shaft, the shafts of the roller electrodes being parallel to the output shaft of the gear transmission and with the drive shaft of the motor.

7. A welding machine as claimed in claim 5 and further characterized by the fact that said rotating means comprises an electric motor having a drive shaft and also comprises a gear transmission with an output shaft, the shafts of the roller electrodes being located at an angle relative to the output shaft of the gear transmission.

8. A welding machine as claimed in claim 5 and further comprising ducts for cooling liquid to the roller electrodes, said ducts being formed in the shafts of the roller electrodes and being carried to a point near said electrodes.

References Cited by the Examiner

UNITED STATES PATENTS

| | | | |
|---|---|---|---|
| 2,206,549 | 7/1940 | McIntosh et al. | 219—82 |
| 2,209,932 | 7/1940 | Rietsch | 219—81 |
| 2,227,249 | 12/1940 | De Ganahl | 219—82 |
| 2,439,915 | 4/1948 | Weightman | 219—82 |

FOREIGN PATENTS 1,124,616   3/1962   Germany.

RICHARD M. WOOD, *Primary Examiner.*

B. STEIN, *Assistant Examiner.*